(12) United States Patent
Im

(10) Patent No.: US 12,122,434 B2
(45) Date of Patent: Oct. 22, 2024

(54) SELF-MONITORING SYSTEM AND METHOD

(71) Applicant: GLOBIZ CO., LTD., Seoul (KR)

(72) Inventor: Jun Sik Im, Seoul (KR)

(73) Assignee: GLOBIZ CO., LTD., Seoul (KR)

( * ) Notice: Subject to any disclaimer, the term of this patent is extended or adjusted under 35 U.S.C. 154(b) by 184 days.

(21) Appl. No.: 17/789,843

(22) PCT Filed: Jan. 13, 2021

(86) PCT No.: PCT/KR2021/000428
§ 371 (c)(1),
(2) Date: Jun. 29, 2022

(87) PCT Pub. No.: WO2021/145656
PCT Pub. Date: Jul. 22, 2021

(65) Prior Publication Data
US 2023/0057969 A1    Feb. 23, 2023

(30) Foreign Application Priority Data
Jan. 13, 2020  (KR) .................. 10-2020-0004290

(51) Int. Cl.
*B61L 15/00* (2006.01)
*G05B 23/02* (2006.01)

(52) U.S. Cl.
CPC ....... *B61L 15/0081* (2013.01); *B61L 15/0018* (2013.01); *B61L 15/0072* (2013.01)

(58) Field of Classification Search
CPC ..................... B61L 15/0081; G05B 23/0283
See application file for complete search history.

(56) References Cited

U.S. PATENT DOCUMENTS

| 5,563,799 | A  | * | 10/1996 | Brehmer | G06F 11/0757 |
|   |   |   |   |   | 713/340 |
| 11,921,195 | B2 | * | 3/2024 | Bauer | G01S 13/584 |
| 2006/0010351 | A1 |   | 1/2006 | Lee |   |
| 2010/0332059 | A1 | * | 12/2010 | Lee | B62K 23/04 |
|   |   |   |   |   | 701/22 |

(Continued)

FOREIGN PATENT DOCUMENTS

| KR | 10-2002-0054439 | 7/2002 |
| KR | 10-2009-0081712 | 7/2009 |

(Continued)

*Primary Examiner* — Long T Tran
(74) *Attorney, Agent, or Firm* — LEX IP MEISTER, PLLC

(57) ABSTRACT

A self-monitoring system is disclosed. The self-monitoring system may include: a control unit that receives and processes a monitoring signal for monitoring of an operating system; a power unit for supplying default power to the control unit; a communication unit that transmits, to a server unit, at least a portion or all of the monitoring signal processed by the control until; and a watchdog unit that monitors the supply of the default power and the operation of the control unit and, when it is detected that there is an abnormality in the supply of the default power or the operation of the control unit, and blocks data transmission to the server unit via the communication unit. In addition, a self-monitoring method to be applied to a self-monitoring system is disclosed.

15 Claims, 13 Drawing Sheets

(56) References Cited

U.S. PATENT DOCUMENTS

| | | | | |
|---|---|---|---|---|
| 2012/0276841 | A1* | 11/2012 | Mason | B61L 15/0027 |
| | | | | 455/7 |
| 2013/0201316 | A1* | 8/2013 | Binder | G07C 3/02 |
| | | | | 701/2 |
| 2015/0109077 | A1 | 4/2015 | Tomimbang et al. | |
| 2016/0282229 | A1 | 9/2016 | Qin et al. | |
| 2017/0242467 | A1* | 8/2017 | Kelly | G06F 1/30 |
| 2019/0213100 | A1* | 7/2019 | Tayeb | G06F 11/3096 |
| 2019/0317123 | A1* | 10/2019 | Woodbridge | H04B 17/104 |
| 2020/0037053 | A1* | 1/2020 | Cobb | H04Q 9/00 |
| 2021/0256782 | A1* | 8/2021 | Ehlers | G07C 5/0816 |

FOREIGN PATENT DOCUMENTS

| | | |
|---|---|---|
| KR | 10-2014-0026822 | 3/2014 |
| KR | 10-1646210 | 8/2016 |
| KR | 10-2019-0013648 | 2/2019 |
| KR | 10-2019-0083029 | 7/2019 |

* cited by examiner

SELF-MONITORING SYSTEM AND METHOD

TECHNICAL FIELD

The present invention relates to a self-monitoring system and a method thereof. In particular, it relates to a self-monitoring system and method that can secure more reinforced reliability when monitoring for condition-based maintenance in an operation system.

BACKGROUND ART

A condition-based maintenance (CBM) technology has been applied worldwide to increase the safety and availability of systems and reduce maintenance costs in transportation devices such as railway vehicles, power generation equipment, or other production equipment. Currently, the reliability-based maintenance method, which is carried out at regular intervals, may perform over-maintenance by performing maintenance even though there is no failure or it may be difficult to cope with failures that occur early due to product quality dispersion.

On the other hand, the condition-based maintenance technology can diagnose defects at an early stage and predict the remaining life by mounting a sensor on a main system and monitoring the state of the main system.

Through such a predictive maintenance technology, accidents of operating equipment can be prevented and the cost of loss due to unexpected failure can be reduced.

In order to secure reliability of the CBM technology, it is necessary to monitor the occurrence of errors in sensor signal processing or communication due to the influence of the surrounding environment, and the like, and fundamentally block the inaccuracy of diagnosis and prediction based on a wrong signal.

The above information disclosed in this Background section is only for enhancement of understanding of the background of the invention, and therefore it may contain information that does not form the prior art that is already known in this country to a person of ordinary skill in the art.

DISCLOSURE

Technical Problem

An embodiment of the present invention is to provide a self-monitoring system and a method for preventing errors in various operation systems by implementing self-diagnosis monitoring of a monitoring system that acquires, processes, and transmits signals from various operation systems. In addition, an embodiment of the present invention is to provide a self-monitoring system and a method that can self-diagnose and solve problems when abnormalities occur depending on the influence of the surrounding environment in a control device that processes signals and controls transmission in the operation system.

Technical Solution

A self-monitoring system according to an embodiment of the present invention may include: a control unit that receives and processes a monitoring signal for monitoring of an operation system; a power unit that supplies basic power to the control unit; a communication unit that transmits at least a part or all of the monitoring signal processed by the control unit to a server unit; and a watchdog unit that monitors supply of the basic power and operation of the control unit, and blocks data transmission to the server unit through the communication unit when an abnormality is sensed in the supply of the basic power or the operation of the control unit.

The watchdog unit may receive separate power from the power unit, determine whether the basic power supplied to the control unit is not included in a predetermined supply range, and determine whether the control unit operates normally, and when the basic power is not included in the supply range or the control unit abnormally operates, the watchdog unit may transmit a holding signal to the communication unit to block data transmission.

The watchdog unit includes a counter, the counter periodically receives a trigger signal from the control unit, and the watchdog unit may determine that the control unit abnormally operates when the counter does not receive the trigger signal within a predetermined time period.

The watchdog unit reboots the control unit by transmitting a reset signal to the control unit when the abnormal operation of the control unit is determined, and the watchdog unit may reset the communication unit to release a data transmission blocking state when the basic power returns to the predetermined supply range within a certain period of time after deviating from the predetermined supply range or when the control unit operates normally after the abnormal operation.

The monitoring signal includes a digital signal converted to digital and provided to the control unit, and an analog signal provided to the control unit without digital conversion, and the control unit monitors a state of supply power supplied to at least one sensor that senses a state of the operation system or supplied to the operation system from the power unit or a digital conversion error of an analog signal among the monitoring signals, and when there is an error in the supply power or the digital conversion error is determined, a holding signal may be transmitted to the communication unit to block data transmission.

The self-monitoring system may further include an ADC unit that performs digital conversion to a digital signal provided to the control unit, wherein the control unit may include a separate analog-digital converter built therein to convert the analog signal to digital to generate a comparison digital signal, compare the digital signal received from the ADC unit with the comparison digital signal, and determine the digital conversion error when there is an error over a predetermined range between the digital signal and the comparison digital signal.

The self-monitoring system may be applied for condition-based maintenance of the operation system in transportation equipment, power generation equipment, or production equipment.

The transportation equipment may be a railway vehicle, and the self-monitoring system may be applied to at least one module among a module for a condition-based maintenance system of a vehicle wheel set, a module for a condition-based maintenance system of a vehicle drive motor, and a module for a condition-based maintenance system of vehicle air conditioning equipment, respectively, or may be applied to an integrated system including at least two of the above-stated modules.

When the server unit cannot communicate with the communication unit for more than a predetermined time period, the server unit may display an abnormal signal or transmit an abnormal signal to a predetermined administrator terminal.

A self-monitoring method according to another embodiment of the present invention includes: first monitoring for monitoring a state of basic power supplied to a control unit that receives and processes a monitoring signal for monitoring of an operation system and an operation state of the control unit by a watchdog unit; data transmitting in which at least a part or all of the monitoring signal processed by the control unit to a server unit in a communication unit; and transmission blocking in which the data transmission to the server unit through the communication unit is blocked when it is monitored that the supply of the basic power or operation of the control unit is abnormal in the first monitoring by the watchdog unit.

In the first monitoring, the supply abnormality of the basic power is determined based on whether the basic power supplied to the control unit is not included in the predetermined supply range and the operation abnormality of the control unit is determined based on whether a trigger signal periodically received by the watchdog unit from the control unit is received within a predetermined period, and in the data transmission blocking, when it is determined that the supply of the basic power is abnormal or the operation of the control unit is abnormal, the watchdog unit may transmit a holding signal to the communication unit to block data transmission.

In the transmission blocking, the watchdog unit may reboot the control unit by transmitting a reset signal to the control unit when determining abnormal operation of the control unit, and the self-monitoring method may further include, when the basic power returns to within the predetermined supply range within a certain period of time or the control unit operates normally after the transmission blocking, releasing blocking in which the data transmission blocking state is released by resetting the communication unit by the watchdog unit.

The monitoring signal may include a digital signal converted to digital and provided to the control unit, and an analog signal provided to the control unit without digital conversion, the self-monitoring method may further include second monitoring in which a state of supply power supplied to at least one of sensors sensing the state of the operation system or supplied to the operation system or a digital conversion error of an analog signal among the monitoring signal is monitored by the control unit, and in the data transmission blocking, when it is determined that the supply of the basic power is abnormal or the operation of the control unit is abnormal, the watchdog unit may transmit a holding signal to the communication unit to block data transmission.

The control unit may include a built-in analog-digital converter separately from an analog-digital converting unit that converts digital signals provided to the control unit and transmits them to the control unit, the self-monitoring method may further include digital converting in which the analog signal is digitally converted to generate a comparison digital signal by the analog-digital converter by the control unit, and in the second monitoring, the digital signal received from the analog-digital converting unit may be compared with the comparison digital signal, and when there is an error over the predetermined range between the digital signal and the comparison digital signal, the digital conversion error may be determined.

The self-monitoring method may further include abnormality displaying in which an abnormal signal is displayed or an abnormal signal is transmitted to a predetermined manager terminal when communication with the communication unit is not possible for more than a predetermined time period by the server unit.

The self-monitoring method may be applied for condition-based maintenance of the operation system in transportation equipment, power generation equipment, or production equipment.

The transportation equipment may be a railway vehicle, and the self-monitoring method may be applied for condition-based maintenance of at least one of a vehicle wheel set, a vehicle drive motor, and a vehicle air conditioner.

Advantageous Effects

According to one embodiment of the present invention, self-diagnosis monitoring is formed in the monitoring system that acquires, processes, and transmits signals from various operation systems and thus it is possible to prevent errors from occurring as much as possible. For example, when an abnormality occurs according to the influence of the surrounding environment in a control device that processes signals and controls transmission in the operation system, it can be self-diagnosed to solve the problem.

Although not directly mentioned in the specification of the present invention, it is evident that various characteristic effects can be derived within the range of understanding of those of ordinary skill in the art from the characteristics of configurations to various configurations included in various embodiments and exemplary variations of the present invention.

DESCRIPTION OF THE DRAWINGS

Embodiments of the present specification may be better understood by reference to the following description in conjunction with accompanying drawings in which like reference signs refer to identical or functionally similar elements.

Figure 1:
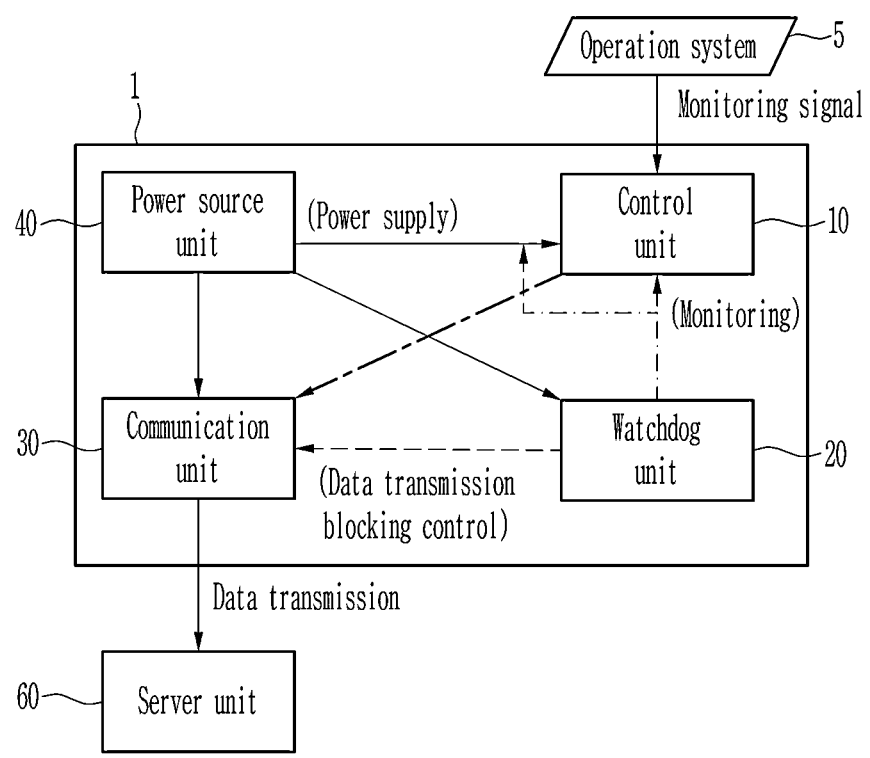
FIG. 1 is a schematic block diagram of a self-monitoring system according to an embodiment of the present invention.

The drawings referenced above are not necessarily drawn to scale and are to be understood as presenting rather simplified representations of various preferred features that illustrate the basic principles of the present disclosure. For example, certain design features of the present disclosure, including, particular dimensions, direction, position, and shape will in part be determined by the particular intended application and environment of use.

MODE FOR INVENTION

The terminology used herein is for the purpose of description of particular embodiments only, and is not intended to limit the present disclosure. As used herein, singular forms are intended to also include plural forms unless the context clearly dictates otherwise. The terms "comprises" and/or "comprising" specify the presence of the mentioned features, integers, steps, operations, constituent elements, and/or components when used in the present specification, but it will also be understood that this does not exclude the presence or addition of at least one of other features, integers, steps, operations, constituent elements, components, and/or groups thereof. As used herein, the term "and/or" includes any one or all combinations of the associated listed items.

As used herein, terms such as "vehicle" or "of a vehicle" or other similar terms are understood to include railway vehicles as well as passenger vehicles, including sports utility vehicles (SUVs), buses, trucks, and various commercial vehicles.

Additionally, it is understood that one or more of the methods or aspects thereof below may be executed by at least one control unit (e.g., an electronic control unit (ECU), and the like), a controller, or a control server. The terms "control unit", "controller", or "control server" may refer to a hardware device including a memory and a processor. The memory is configured to store program instructions, and the processor is specifically programmed to execute the program instructions to perform at least one of the processes described in more detail below. A control unit, a controller, or a control server, as described herein, may control the operation of units, modules, parts, devices, and the like. It is also understood that the methods below may be implemented by a device including a control unit or controller together with at least one other component, as recognized by a person of ordinary skill in the art.

In addition, the control unit, controller, or control server of the present disclosure may be implemented as a non-transitory computer-readable recording medium including executable program instructions executed by a processor. Examples of computer-readable recording media include ROM, RAM, compact disk (CD) ROM, magnetic tapes, floppy disks, flash drives, smart cards, and optical data storage devices, but are not limited thereto. The computer readable recording medium may also be distributed throughout a computer network such that program instructions may be stored and executed in a distributed manner such as, for example, a telematics server or a controller area network (CAN).

Self-Monitoring System

A self-monitoring system according to an aspect of the present invention will be described with reference to the attached drawings. Embodiments of the self-monitoring system described below may be equally applied to the self-monitoring method described below.

Figure 2:
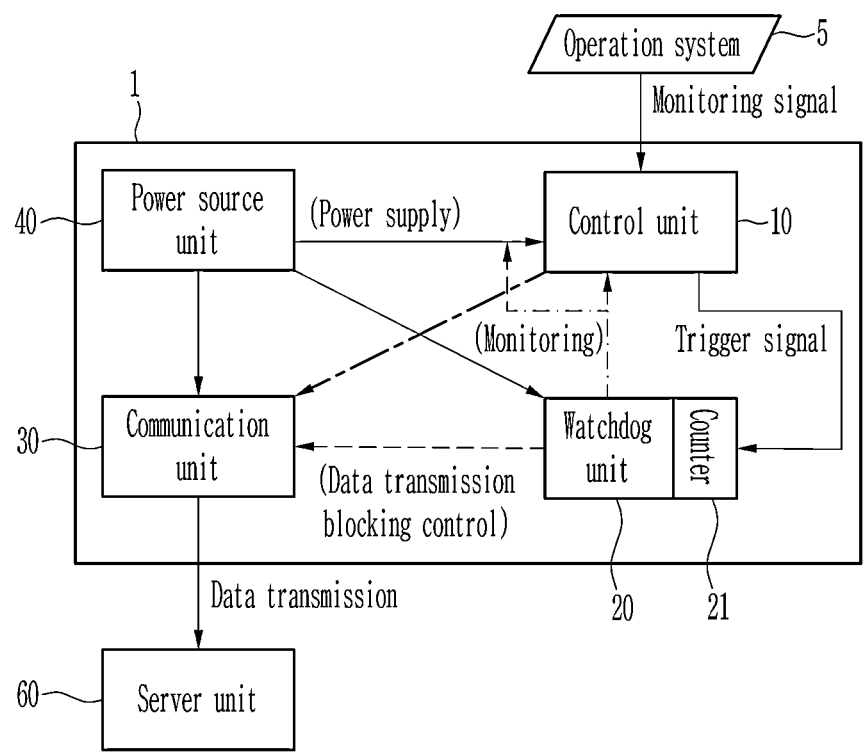
FIG. 2 is a schematic block diagram of a self-monitoring system according to another embodiment of the present invention.
Figure 3:
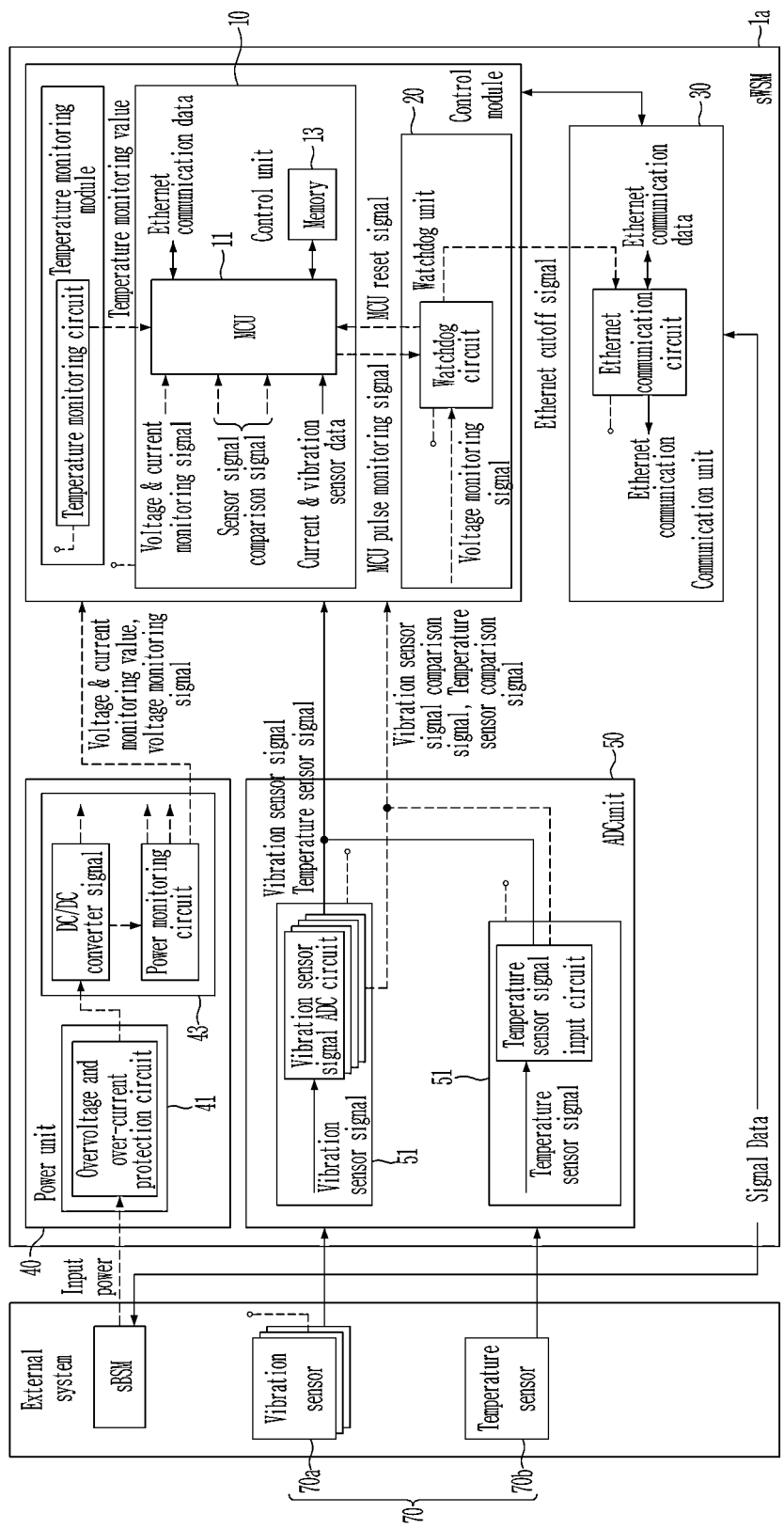
FIG. 3 is a schematic block diagram of a self-monitoring system according to another embodiment of the present invention.
Figure 4:
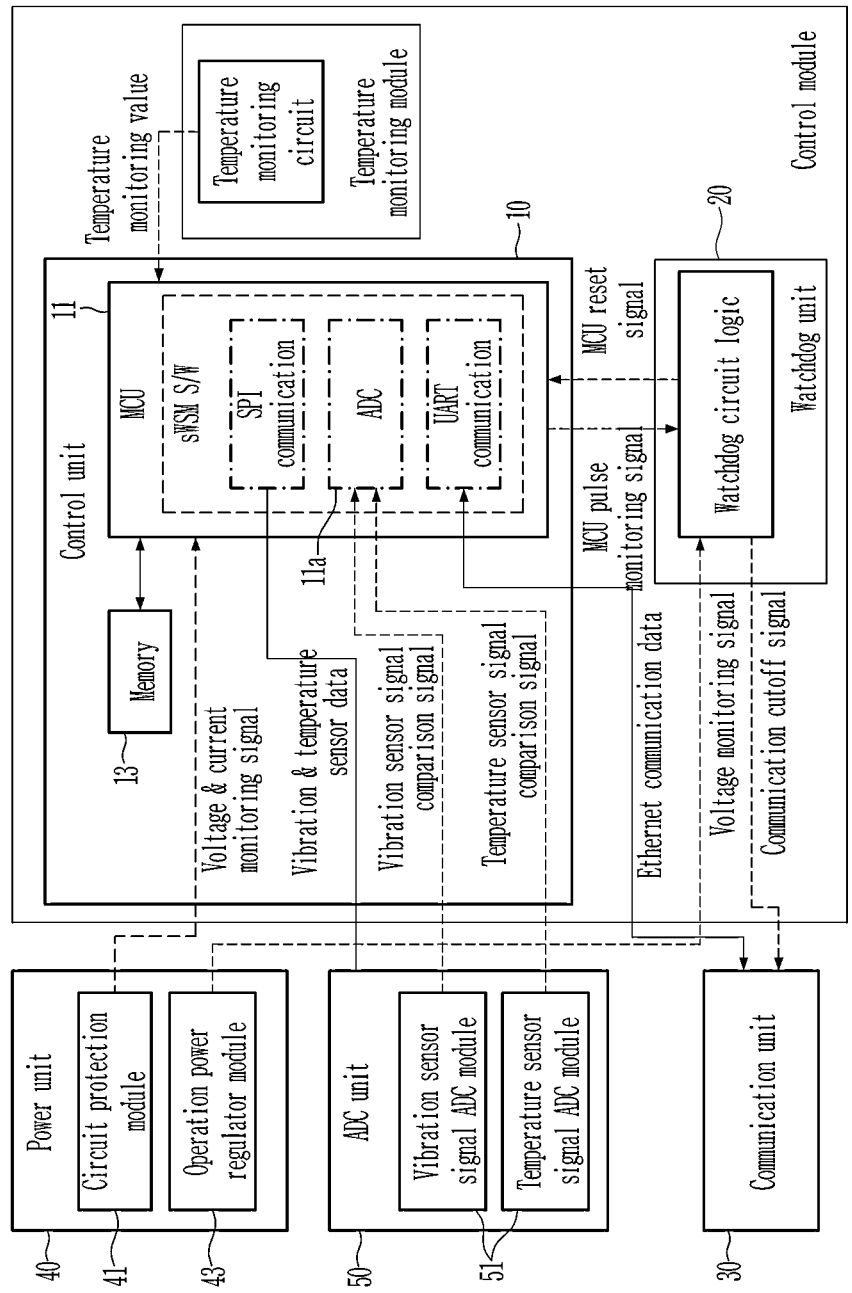
FIG. 4 is a schematic block diagram of a self-monitoring system according to another embodiment of the present invention.
Figure 5:
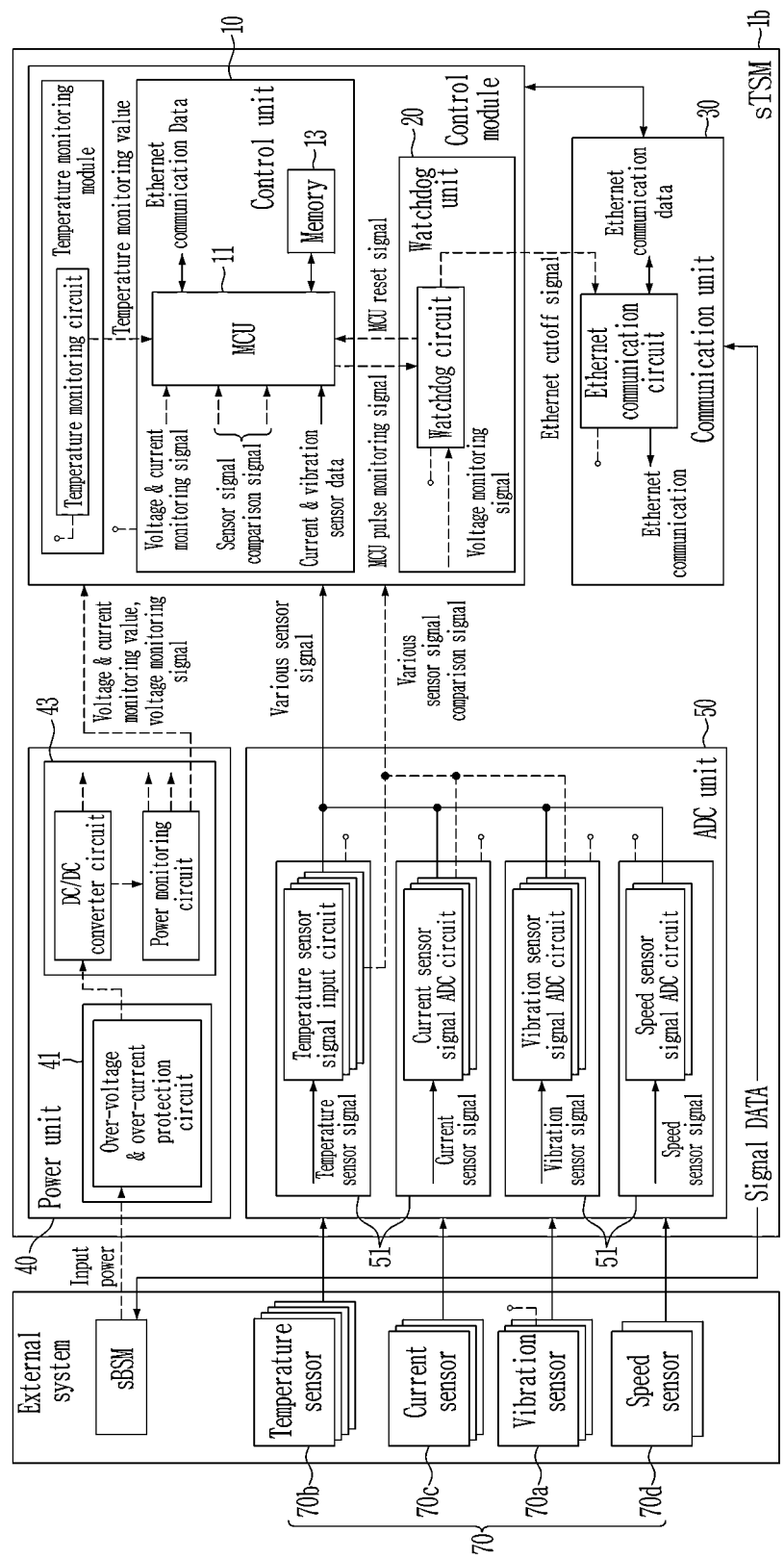
FIG. 5 is a schematic block diagram of a self-monitoring system according to another embodiment of the present invention.
Figure 6:
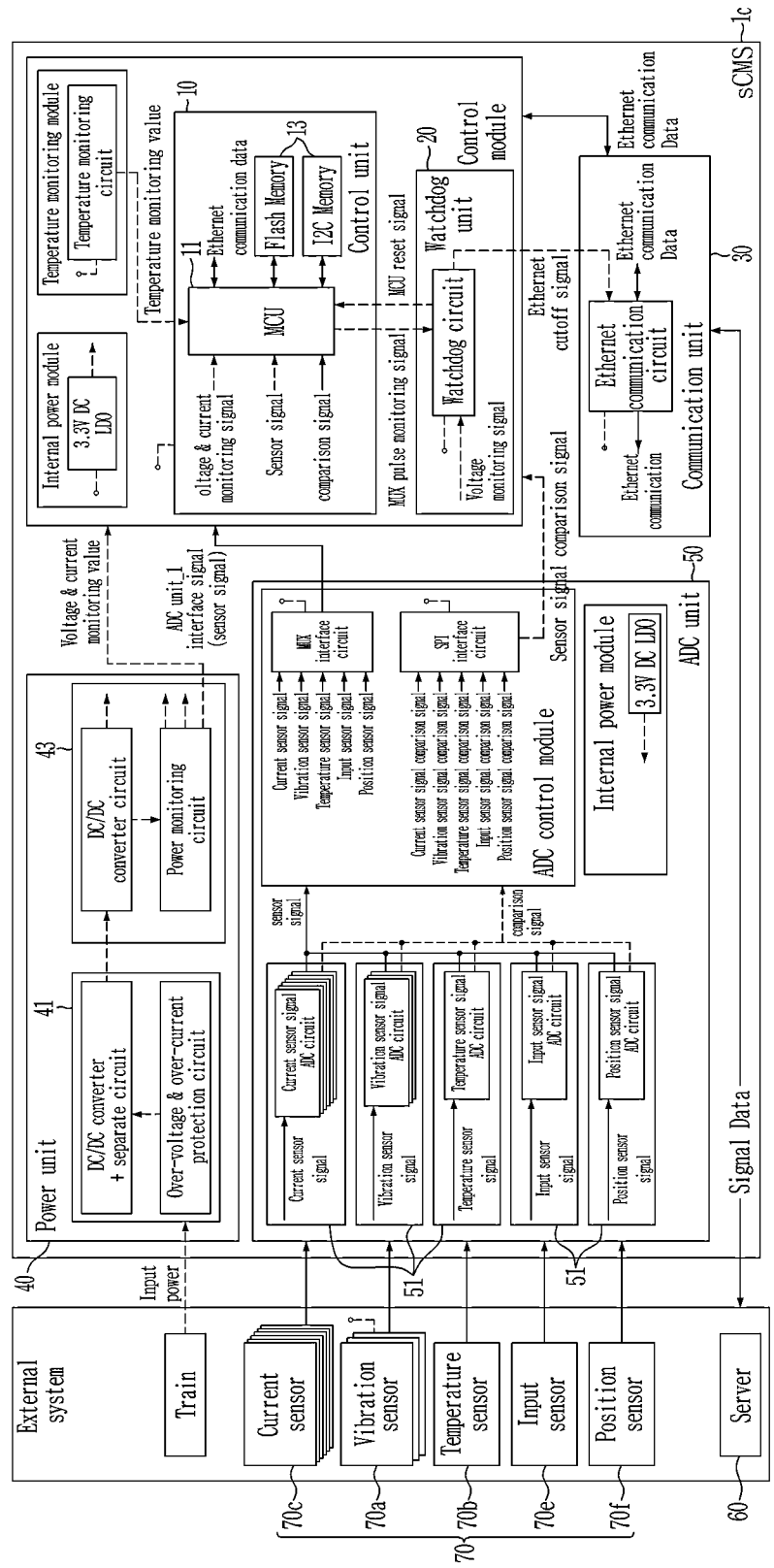
FIG. 6 is a schematic block diagram of a self-monitoring system according to another embodiment of the present invention.
Figure 7:
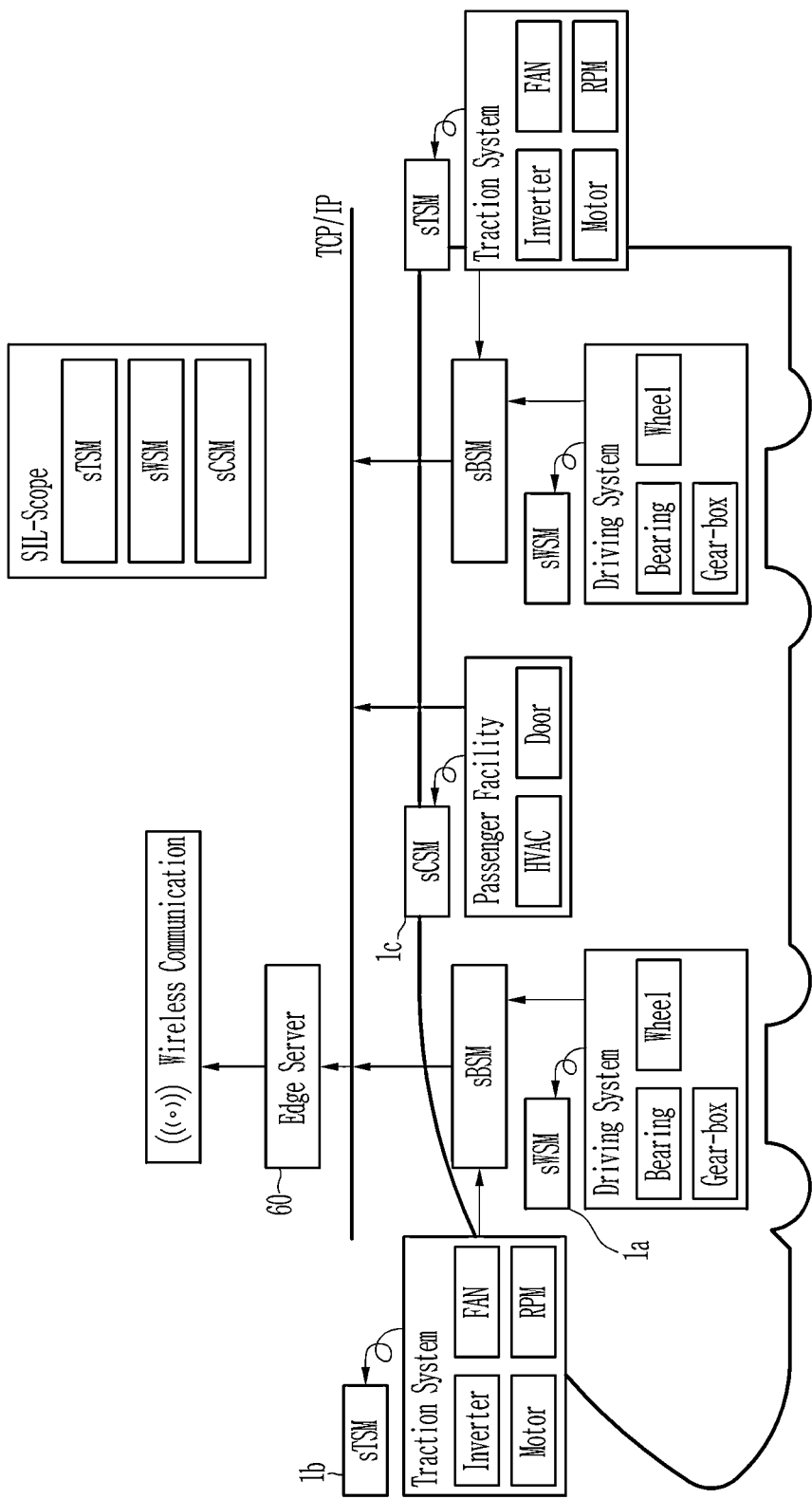
FIG. 7 is a schematic block diagram of a self-monitoring system according to another embodiment of the present invention.

FIG. 1 is a schematic block diagram of a self-monitoring system according to an embodiment of the present invention, FIG. 2 is a schematic block diagram of a self-monitoring system according to another embodiment of the present invention, FIG. 3 is a schematic block diagram of a self-monitoring system according to another embodiment of the present invention, FIG. 4 is a schematic block diagram of a self-monitoring system according to another embodiment of the present invention, FIG. 5 is a schematic block diagram of a self-monitoring system according to another embodiment of the present invention, FIG. 6 is a schematic block diagram of a self-monitoring system according to another embodiment of the present invention, and FIG. 7 is a schematic block diagram of a self-monitoring system according to another embodiment of the present invention.

Embodiments of the present invention provide a technology for preventing errors from occurring as much as possible by implementing self-diagnosis monitoring of a monitoring system that acquires, processes, and transmits signals in various operation systems 5.

Referring to FIGS. 1 to 7, self-monitoring systems 1, 1a, 1b, and 1c according to an example each include a control unit 10, a power unit 40, a communication unit 30, and a watchdog unit 20. Here, the control unit 10 receives a monitoring signal for monitoring the operation system 5, an operation device, or an operating member and processes the received monitoring signal. The power unit 40 supplies basic power to the control unit 10. The communication unit 30 transmits at least some or all of the monitoring signal processed by the control unit 10 to the server unit 60. In addition, the watchdog unit 20 monitors the basic power supply and operation of the control unit 10, and blocks data transmission to the server unit 60 through the communication unit 30 when an abnormality is detected.

For example, self-monitoring systems 1, 1a, 1b, and 1c may be for condition-based maintenance of the operation system 5. For example, the self-monitoring systems 1, 1a, 1b, and 1c may be applied to status diagnosis and status prediction of the operation system 5. For example, the self-monitoring systems 1, 1a, 1b, and 1c may be applied for condition-based maintenance to the operation system 5 of transportation equipment, power generation equipment, or production equipment, and an operation device or operating member. In the present specification, referring to FIG. 3 to FIG. 7, it should be noted that embodiments will be described with a focus on the case of railway vehicles, but are not limited thereto.

In addition, referring to FIG. 2 to FIG. 6, the self-monitoring systems 1, 1a, 1b, and 1c according to an example may further include an analog-digital converting (ADC) unit 50.

Hereinafter, each configuration will be described in detail with reference to FIG. 1 to FIG. 7.

Control Unit 10

Referring to FIG. 1 to FIG. 7, the control unit 10 will be described. The control unit 10 receives and processes a monitoring signal for monitoring of the operation system 5, an operation device, or an operating member. In the embodiment of the present invention, the operation system 5, the operation device, or the operating member means a system, device, or member including a device or member that moves or operates by receiving power or an input. In one example, the operating member may mean a member performing, for example, one detailed operation which forms a part of an integrated or interlocked operation in a system or device that is integrated or interlocked to perform one operation, but is not limited thereto. In another example, the operating member may be a system or device that performs an integrated or interlocked operation. Examples of the operation system 5 include power delivery systems including wheels, axle boxes, and gear boxes in transportation devices, propulsion systems including propulsion motors and inverters, air conditioning systems such as HVAC, customer convenience systems such as automatic doors, and the like, but the present invention is not limited thereto. For example, it can be classified as a convenience system by combining the air conditioning system and the customer convenience system. For example, referring to FIG. 7, in railway vehicles, examples of an operation device or an operating member of a vehicle wheel set may include a vehicle wheel, a wheel bearing, and the like. In addition, examples of an operation device or an operating member of a vehicle drive motor system may include a motor, a fan, and the like, and may further include a device for measuring the RPM of the motor. In addition, examples of an operation device or an operating member of a vehicle air conditioning system may include a compressor, an evaporator, a blower, and the like. In the case of a customer convenience system, an automatic door may be included. The operation device or operating members shown in FIG. 7 are illustrated as examples and not limited thereto. In the present specification, the operation system 5, the operation device, or the operating member will all be referred to as the operation system 5.

In the embodiment of the present invention, the monitoring signal refers to a signal that senses or detects an operation or a state of the operation system 5. For example, the monitoring signal may be a sensing signal detected by sensors 70 and 70*a*-70*f*. For example, the monitoring signal may be a detection signal or a generation signal regarding the operation state of the operation system 5. For example, the monitoring signal may be a detection signal or a sensed signal regarding an operation status of a power delivery system, a propulsion system, an air conditioning system, and/or a convenience system or device in transportation equipment, power generation equipment, or production equipment, and the like.

The monitoring signal may include a digital signal converted to digital and provided to the control unit 10, and an analog signal provided to the control unit 10 without digital conversion. When an analog signal is input to the control unit 10 as a monitoring signal, the control unit 10 may convert the analog signal to digital by itself. For example, processing of the monitoring signal in the control unit 10 may be a pre-signal processing for transmission to the server unit 60 through the communication unit 30 or the transmission processing itself to the communication unit 30.

Referring to FIG. 3 to FIG. 6, the control unit 10 may be implemented as a micro control unit (MCU) 11 or may include an MCU 11. For example, the control unit 10 may further include a memory 13 in addition to the MCU 11. In this case, the memory 13 may include a buffer memory and/or a storage memory for data storage, which is a temporary storage space for signal processing in the MCU 11. The memory 13 is not included in the control unit 10 and may be formed as a separate memory unit.

In one example, the control unit 10 may monitor a power supply state of at least one of the sensors 70 and 70*a* to 70*f* that detect a state of the operation system 5 or the operation system 5, which is a target to be monitored, from the power unit 40, or a digital conversion error of an analog signal among monitoring signals input to the control unit 10. Referring to FIG. 3 to FIG. 6, the control unit 10 receives a voltage and/or current monitoring signal (value) from an operation power regulator module 43 of the power unit 40, more specifically, from a power monitoring circuit of the operation power regulator module 43, and may monitor a state of power supply supplied to the sensor 70 or the monitoring target. The monitoring of the digital conversion error of the analog signal by the control unit 10 will be described in detail hereinafter. The analog signal may be a signal detected by at least one of the sensors 70 and 70*a* to 70*f* or a signal generated by the operation system 5 as a monitoring target. In this case, the control unit 10 may block data transmission by transmitting a holding signal to the communication unit 30 when there is an error in the supplied power or a digital conversion error is determined based on the monitoring result. The transmission of the holding signal to the communication unit 30 by the control unit 10 is carried out when the supplied power is abnormal or the digital conversion error occurs. On the contrary, there is a difference between the transmission of the holding signal to the communication unit 30 by the watchdog unit 20 in the case of an abnormality in the basic power supplied to the control unit 10 or an abnormal operation of the control unit 10.

For example, when the control unit 10 or the MCU 11 operates normally, an error that may occur in a module that converts the analog signal detected by the sensors 70 and 70*a* to 70*f* into digital data and an error in a power state used by the peripheral devices such as the sensors 70 and 70*a* to 70*f* are monitored directly by the control unit 10 or the MCU 11. In the specification, the peripheral devices may include the sensors 70 and 70*a* to 70*f* and the operation system 5, which is a monitoring target. In this case, the control unit 10 or MCU 11 monitors the power used by the peripheral devices such as the sensors 70 and 70*a* to 70*f*, and when there is an error in the supply power, the control unit 10 or the MCU 11 transmits a holding signal to the communication unit 30.

For example, referring to FIG. 4, a control unit 10 may include a separate built-in analog-digital converter (ADC) 11*a*. Apart from the ADC 11*a* built into the control unit 10, referring to FIG. 2 to FIG. 6, the self-monitoring systems 1, 1*a*, 1*b*, and 1*c* may be equipped with an ADC unit 50. The ADC unit 50 converts analog signals for monitoring to digital and transmits the digital signal to the control unit 10. The analog signal for monitoring the digital conversion in the ADC unit 50 is a signal detected by the sensors 70 and 70*a* to 70*f* or generated by the operation system 5 which is the monitoring target. In addition, the control unit 10 receives an analog signal that is not digital converted in the ADC unit 50, and the ADC 11*a* of the control unit 10 may generate a comparison digital signal by digital-converting the analog signal. In FIG. 3 to FIG. 6, the comparison digital signals for various sensor signals are signals that are digital-converted from an analog signal that is not digitally converted by each ADC module 51 of the ADC unit 50 by the ADC 11*a* of the control unit 10. A comparison signal (i.e., an analog signal) of each sensor signal that is not digitally converted in each ADC module 51 is transmitted to the control unit 10, for example, to the MCU 11, and referring to FIG. 4, the ADC 11*a* of MCU 11 converts the comparison signal to digital and generates a comparison digital signal. The comparison digital signal may be digitally converted by each ADC module 51 and compared with a digital signal of each sensor signal transmitted to the control unit 10.

The control unit 10 compares the digital signal received from the ADC unit 50 with the comparison digital signal converted by the analog-digital converter (ADC) 11a to determine whether there is an error over the predetermined range between the digital signal and the comparison digital signal, and when there is an error over the predetermined range between the digital signal and the comparison digital signal, it can be determined as a digital conversion error. For example, referring to FIG. 4, each sensor signal, which is a digital signal received from each ADC module 51 of the ADC unit 50, is compared with a comparison digital signal input to the control unit 10 without digital conversion at each ADC module 51 and digitally converted by the ADC 11a of the control unit 10, and when there is an error over the predetermined range between the digital signal and the comparison digital signal, the control unit 10, for example, the MCU 11, may determine that there is a digital conversion error.

Typically, the ADC unit 50 which digitizes analog signals used in the condition-based maintenance (CBM) systems, uses high-resolution and high-precision components. In this case, a separate ADC module 11a is also built-in inside the MCU 11, and a measured analog signal is converted into a comparison digital signal, and thus the digital converted digital signal in in the ADC unit 50 and the digital converted comparison digital signal in the ADC module 11a are mutually compared. When there is an error over a dynamic range between the digital converted digital signal in the ADC unit 50 and the digital converted digital signal in the ADC module 11a, the MCU 11 may transmit a holding signal to prevent data transmission to the communication unit 30. Here, the impedance of the ADC module 11a built in the MCU 11 is very large, and thus an analog signal coupling problem does not occur. In addition, the measured analog signal may pass through a low pass filter before being converted to digital in the ADC module 11a.

For example, when the problem of supply power or digital conversion error that caused the blockage is resolved after the data transmission of the communication unit 30 by the control unit 10 is blocked, the control unit 10 resets the holding state of the communication unit 30 and releases the data transmission blocking state. For example, the control unit 10 may release the holding state of the communication unit 30 when there is no problem in the state of digital data processed by the ADC unit 50 within a predetermined period of time, and when there is no problem in the supply power supplied to peripheral devices such as the sensors 70 and 70a to 70f.

Referring to FIG. 4, the control unit 10, for example, the MCU 11 receives sensor data (e.g., a digital signal) from the ADC unit 50 through serial peripheral interface (SPI) communication, and may transmit and receive ethernet communication data with the communication unit 30 through a universal asynchronous receiver/transmitter (UART). In FIG. 4, the control unit 10, for example, the ADC module 11a of the MCU 11, may receive an analog signal of each non-digital sensor signal from each ADC module 51 of the ADC unit 50 and perform digital conversion.

Referring to FIG. 3 to FIG. 6, the control unit 10 may form a control module together with the watchdog unit 20, but is not limited thereto. For example, referring to FIG. 3 to FIG. 6, the control module may further include a temperature monitoring module, but is not limited thereto. The temperature monitoring module may perform temperature monitoring and transmit a temperature monitoring value to the control unit 10, that is, the MCU 11. For example, referring to FIG. 6, the control module further includes an internal power module, and power can be supplied to the control unit 10 and the like in the control module. In this case, even when the control module includes an internal power module, the power supply to the watchdog unit 20 may be handled by the power unit 40.

Power Unit 40

Referring to FIG. 1 to FIG. 7, the power unit 40 will be described. The power unit 40 supplies basic power to the control unit 10. In this case, the watchdog unit 20 monitors a state of basic power supplied from the power unit 40 to the control unit 10. For example, referring to FIG. 3, FIG. 5, and FIG. 6, the power unit 40 may be a power conversion device that converts the power to supply power supplied from a power source of transportation equipment such as a railway vehicle, wind power generator equipment, production equipment, and the like to which the self-monitoring system 1a, 1b, and 1c are applied to components of each of the self-monitoring systems 1a, 1b, and 1c and a monitoring target. For example, referring to FIG. 3 to FIG. 6, the watchdog unit 20 monitors the state of basic power, that is, a voltage monitoring signal from an operation power regulator module 43 of the power unit 40, for example, from a power monitoring circuit of the operation power regulator module 43. In this case, the voltage monitoring signal monitored by the watchdog unit 20 is a separate signal from a voltage/current monitoring signal (value) monitored by the control unit 10, that is, an MCU 11, which will be described later. That is, the voltage monitoring signal monitored by the watchdog unit 20 is a monitoring signal for basic power supplied to the control unit 10, and the voltage/current monitoring signal (value) monitored by the control unit 10, that is, the MCU 11 is a monitoring signal for the supply power supplied to the sensor 70 or a system peripheral device.

For example, the power unit 40 may supply power to the watchdog unit 20 separately from the control unit 10. In an embodiment of the present invention, the basic power refers to the power provided from the power unit 40 to the control unit 10, and the separate power refers to the power provided to the watchdog unit 20. For example, the power unit 40 is provided with the operation power regulator module 43 to supply basic power supplied to the control unit 10 and a separate power supply to the watchdog unit 20.

For example, the power unit 40 may supply power to at least one of the sensors 70 and 70a to 70f and/or at least one system peripheral device for detecting the state of the operation system 5. In this case, the state of the supply power supplied to the at least one of the sensors 70 and 70a to 70f and/or at least one system peripheral device can be monitored in the control unit 10. The system peripheral device may include the operation system 5 which is a monitoring target or the sensors 70 and 70a to 70f, referring to FIG. 3 to FIG. 6, the state of the supply power supplied to the sensor 70 or the system peripheral device, that is, the voltage/current monitoring signal (value), is transmitted through the operation power regulator module 43 of the power unit 40, for example, a power monitoring circuit of the operation power regulator module 43, to the control unit 10, for example, the MCU 11 and monitored.

Referring to FIG. 3 to FIG. 6, the power unit 40 may include a circuit protection module 41 and the operation power regulator module 43, but is not limited thereto. For example, referring to FIG. 3 and FIG. 5, the circuit protection module 41 is provided with an overvoltage and overcurrent protection circuit and thus may protect self-monitoring systems 1, 1a, 1b, and 1c from a surge voltage or overcurrent. In addition, referring to FIG. 6, the circuit protection module 41 is equipped with a DC/DC converter/isolation circuit to properly convert a power signal that has passed through the surge voltage or passed through the overcurrent protection circuit. The operation power regulator module 43 may have a DC/DC converter circuit and a power monitoring circuit. The operation power regulator module 43 may supply an appropriate voltage and/or current to the control unit 10 of each unit or device of the system through DC/DC conversion. In particular, the operation power regulator module 43 may supply a separate power source to the watchdog unit 20, which is separate from the basic power supplied to the control unit 10. For example, the power monitoring circuit of the operation power regulator module 43 transmits the state of basic power supplied to the control unit 10 as a voltage monitoring signal to the watchdog unit 20, and may transmit the state of the supply power supplied to the sensor 70 or units or devices of other system as a voltage/current monitoring signal (value) to the control unit 10, that is, the MCU 11.

Communication Unit 30

The communication unit 30 will be described with reference to FIG. 1 to FIG. 7. The communication unit 30 transmits at least some or all of the monitoring signal processed by the control unit 10 to the server unit 60. In FIG. 3 and FIG. 5, in the case of a smart wheel sensor module sWSM or a smart traction system module sTSM in the railway vehicle, the communication unit 30 transmits signal data to a smart Bogie system module sBSM, and in the case of a smart condition monitoring system sCMS in the railway vehicle in FIG. 6 and FIG. 7, the communication unit 30 transmits signal data to the server 60 without transmitting through the sBSM.

For example, the communication unit 30 may perform wired and/or wireless-based communication. For example, the wireless-based communication may be short-range wireless communication such as wireless LAN, Wi-Fi, and Bluetooth, but is not limited thereto. For example, the communication unit 30 may be a local area network (LAN), that is, an Ethernet communication unit. For example, when the communication unit 30 is an Ethernet communication unit, the communication unit 30 may include an Ethernet transceiver and a LAN transformer, but is not limited thereto. For example, the LAN transformer may communicate with the server unit 60 and the Ethernet transceiver may receive the holding signal transmitted from the watchdog unit 20 or the holding signal transmitted from the control unit 10.

Watch Don Unit 20

Referring to FIG. 1 to FIG. 7, the watchdog unit 20 will be described. The watchdog unit 20 monitors basic power supply and operation of the control unit 10, and blocks data transmission to the server unit 60 through the communication unit 30 when abnormality is detected. The watchdog unit 20 monitors the errors caused by the control unit 10 to secure the reliability of the CBM technology to fundamentally block the inaccuracy of diagnosis and/or prognosis based on the wrong signal.

For example, the self-monitoring system according to the embodiment of the present invention can be applied to systems such as transportation equipment, power generation equipment, and production equipment, but as shown in FIG. 3 to FIG. 7, the case applied to railway vehicles will be exemplified. In order to secure the reliability of the CBM technology for condition diagnosis and condition prediction of major systems or parts of the railway vehicle, it is necessary to prevent errors from occurring in the processing of measured sensor signals or communication of processed signals. Accordingly, it is necessary to fundamentally block the inaccuracy of diagnosis and prediction based on the wrong signal by the self-monitoring sensor signal processing or communication errors. For example, causes of the most serious abnormality in the process of digital conversion and communication of analog sensor signals detected in railway vehicles and the like may include a case having a problem with the basic power of the main computing device (e.g., the MCU 11) of the system and a case where the MCU 11 does not operate properly due to environmental factors. Therefore, it is necessary to monitor the basic power supply status to the control unit 10 and the operation status of the control unit 10. The watchdog unit 20 having a logic circuit is provided for monitoring such a state.

Referring to FIG. 1 to FIG. 6, in one example, the watchdog unit 20 operates by receiving a separate power supply from the power unit 40. For example, the watchdog unit 20 is formed as a circuit that uses a separate power supply from the basic power of MCU 11 and is not significantly affected by power fluctuations such that the watchdog unit 20 can operate well when there is a problem in the basic power supplied to the MCU 11. For example, as shown in FIG. 6, even when the watchdog unit 20 and the control unit 10 form a control module and an internal power module is provided in the control module, the internal power module in the control module supplies power to the control unit 10 but the watchdog unit 20 operates by receiving separate power not from the internal power module in the control module but from the power unit 40.

In this case, the watchdog unit 20 monitors the basic power supplied from the control unit 10 to determine whether the basic power is not included in a predetermined supply range, and determines whether the control unit 10 is in a normal operation state. For example, a monitoring signal with respect to the basic power supplied to the control unit 10 may be received from the operation power regulator module 43 of the power unit 40. For example, since the operation power regulator module 43 of the power unit 40 supplies power to the control unit 10, the watchdog unit 20 can monitor whether the power is well supplied from the operation power regulator module 43 to the control unit 10. The watchdog unit 20 may block data transmission of the communication unit 30 by transmitting a holding signal to the communication unit 30 when the basic power is out of the predetermined supply range or when it is determined that the control unit 10 is operating abnormally. For example, as shown in FIG. 3 to FIG. 6, the holding signal may be a communication cut-off signal that blocks communication. The watchdog unit 20 always monitors the voltage and current of the basic power supplied to the control unit 10 or the MCU 11, and when any one of the voltage and current exceeds the predetermined supply range, the watchdog unit 20 supplies the holding signal to the communication unit 30 to prevent transmission of data that may have an error.

For example, referring to FIG. 2, the watchdog unit 20 may be provided with a counter 21. In this case, the counter 21 periodically receives a trigger signal from the control unit 10. Referring to FIG. 3 to FIG. 6, the trigger signal received from the control unit 10 may be an MCU pulse monitoring signal. The watchdog unit 20 may determine that the control unit 10 operates abnormally when the counter 21 does not receive a trigger signal within a predetermined period. For example, the counter 21 is installed in the watchdog unit 20 and a circuit is formed to periodically receive a predetermined trigger signal in a specific range from the MCU 11, and when the counter 21 does not receive a trigger signal within the specific range, the MCU 11 may be determined to not operate normally. Even in this case, the watchdog unit 20 may transmit a holding signal, for example, a communication cutoff signal, to the communication unit 30 to prevent transmission of data that may have an error.

In addition, in one example, the watchdog unit 20 may reboot the control unit 10 by transmitting a reset signal to the control unit 10 when an abnormal operation is determined. For example, referring to FIG. 3 to FIG. 6, the control unit 10, for example, the MCU 11, can be rebooted by transmitting the MCU reset signal from the watchdog unit 20 to the control unit 10.

In addition, the watchdog unit 20 resets the communication unit 30 to release the block state of the data transmission when the basic power returns to within the predetermined supply range within a predetermined time after deviating from the predetermined supply range, or when the control unit 10 operates normally after abnormal operation For example, the watchdog unit 20 may release the holding state by resetting the communication unit 30 in the holding state when the power status of the MCU 11 returns to normal within a predetermined period of time, or when the MCU 11 operates normally after the MCU 11 is rebooted by generating the MCU reset signal.

For example, referring to FIG. 3 to FIG. 6, the watchdog unit 20 may form the control module together with the control unit 10. In this case, the watchdog unit 20 selectively blocks data transmission to the server unit 60 by controlling the communication unit 30 depending on a state of the basic power supplied to the control unit 10 or whether it is operating normally, and the control unit 10 may selectively block data transmission to the server unit 60 by controlling the communication unit 30 according to the status of the supply power supplied to the peripheral devices such as the sensors 70 and 70a to 70f or whether there is a digital conversion error in the monitoring signal.

Analog-Digital Converting Unit 50

Referring to FIG. 2 to FIG. 6, the self-monitoring systems 1, 1a, 1b, and 1c may further include the ADC unit 50. In this case, the ADC unit 50 converts the analog signal for monitoring to digital and transmits it to the control unit 10. The analog signal for monitoring is a signal detected by the sensors 70 and 70a to 70f or generated by the operation system 5 which is the monitoring target.

For example, referring to FIG. 3 to FIG. 6, the ADC unit 50 includes an ADC module 51. For example, referring to FIG. 3 to FIG. 4, the ADC unit 50 may include the ADC module 51 and as SPI interface 53, but this is not restrictive. For example, the ADC module 51 may be provided in plural according to the number of sensors 70 and 70a to 70f. For example, referring to FIG. 3 to FIG. 4, in the case of the WSM for a wheel set monitoring system, the ADC unit 50 receives a sensing signal from a vibration sensor 70a and a temperature sensor 70b, and the ADC module 51 may be provided with a vibration signal ADC module for digital-conversion of the analog vibration signal and a temperature signal ADC module for digital-conversion of the analog temperature signal. For example, referring to FIG. 5, in the case of the TSM of the railway vehicle, the ADC unit 50 receives sensing signals from a temperature sensor 70b, a current sensor 70c, a vibration sensor 70a, and a speed sensor 70d, and the ADC module 51 may be provided with a temperature signal ADC module, a current signal ADC module, a vibration signal ADC module, and a speed signal ADC module. For example, referring to FIG. 6, in the case of a convenience system (CMS) of the railway vehicle, the ADC unit 50 receives sensing signals from the current sensor 70c, the vibration sensor 70a, the temperature sensor 70b, a pressure sensor 70e, and a position sensor 70f, and the ADC module 51 may include a current signal ADC module, a vibration signal ADC module, a temperature signal ADC module, a pressure signal ADC module, and a position signal ADC module.

For example, the ADC circuit or the ADC module 51 may be provided with a low pass filter (LPF) that processes an analog signal received from the sensors 70 and 70a to 70f, a linear phase filter (LPDF) that phase-processes the signal processed by the LPF, an AD converter that converts the signal processed by the LPDF to a digital signal, and an amplifier (OP-AMP) that amplifies a signal branched out from the LPF.

For example, referring to FIG. 6, the ADC unit 50 may further include an ADC control module in addition to the ADC circuit and the ADC module 51. The ADC control module may perform processing for transmitting digital signals of sensor signals of each sensor processed by the ADC circuit to the ADC module 51 to the control unit 10. In this case, the ADC control module may include an SPI circuit that outputs a multiplexer (MUX) interface signal, which is a signal multiplexed from a sensing signal (i.e., a digital signal) from each sensor and then output, and an analog signal from each sensor, which is not digitally converted by each ADC module 51. In this case, the sensor signal or sensor data output through the MUX interface circuit is transmitted to the control unit 10 and processed therein, and the sensor signal comparison signal output through the SPI circuit is digitally converted by the ADC module 11a and compared with the sensor signal (Data) received from the MUX interface circuit.

Server Unit 60

Next, referring to FIG. 6 and FIG. 7, the server unit 60 will be described. In one example, when the server unit 60 cannot communicate with the communication unit 30 for more than a predetermined time, it may display an abnormal signal or transmit an abnormal signal to a predetermined administrator terminal. For example, communication interruption between the server unit 60 and the communication unit 30 occurs because a communication state is blocked in the communication unit 30 by the holding signal of the watchdog unit 20 and/or the holding signal of the control unit 10. In the examples of FIG. 3 and FIG. 5, the communication unit 30 may be connected with the server 60 through the sBSM.

When the server unit 60 cannot continuously communicate with the communication unit 30 for more than the predetermined time, it determines that the system cannot recover itself and displays an abnormal signal. For example, an alarm may be sent to the administrator. The administrator terminal may be a PC terminal, a tablet terminal, a PDA terminal, or a smart phone terminal that can communicate with the server unit 60, but this is not restrictive.

For example, referring to FIG. 7, the server unit 60 may be a local network server, but is not limited thereto. In FIG. 7, data can be transmitted to the outside through wireless communication through the local network server 60.

Application of System

In one example, the self-monitoring systems 1, 1a, 1b, and 1c may be applied for condition-based maintenance of the operation system 5 in transportation equipment, power generation equipment, or production equipment. For example, the self-monitoring systems 1, 1a, 1b, and 1c may be applied to a status diagnosis and status prediction system of various systems. In the present specification, FIG. 3 to FIG. 7 illustrate embodiments in which the self-monitoring systems 1, 1a, 1b, and 1c are applied to the railway vehicle, but the self-monitoring systems 1, 1a, 1b, and 1c may be applied to other transport devices, for example, vehicles, ships, aircraft, and the like in addition to railway vehicles and may be applied to power generation equipment such as wind power generation and production equipment using motors. However, the application of self-monitoring systems 1, 1a, 1b, and 1c according to the embodiment of the present invention is not limited thereto.

For example, referring to FIG. 3 to FIG. 7, a transport device to which the self-monitoring systems 1, 1a, 1b, and 1c are applied may be a railway vehicle. In this case, referring to FIG. 3 to FIG. 7, the self-monitoring systems 1, 1a, 1b, and 1c may be applied to a module for a condition-based maintenance system of a power delivery system, a module for a condition-based maintenance system of a propulsion system, a module for a condition-based maintenance system of an air conditioning system, a module for a condition-based maintenance system of a customer convenience system, and the like. In addition, the self-monitoring systems 1, 1a, 1b, and 1c may be applied to an integrated system including at least two of the modules. For example, as shown in FIG. 3, FIG. 5, or FIG. 6, the self-monitoring system 1a, 1b, and 1c may be applied to each of the sWSM, the sTSM, and the sCMS, or as shown in FIG. 7, a self-monitoring system, for example, an intelligence condition-based monitoring (iCBM) system may be applied to an integrated system for centralized CBM including the sWSM, the sTSM, and the sCMS.

For example, FIG. 3 illustrates that the self-monitoring system 1a is applied to the sWAM, which is a module for a condition-based maintenance system of a vehicle wheel set, and the sWSM indicates a monitoring system for condition-based maintenance (CBM) of a railway vehicle wheel set. FIG. 5 illustrates application of the self-monitoring system 1b to the sTSM, which is a module for a condition-based maintenance system of a vehicle driving motor, and the sTSM indicates a monitoring system for CBM of a railway vehicle drive motor system. FIG. 6 shows application of the self-monitoring system 1c to the sCMS, which is a module for a condition-based maintenance system of a convenience system such as an air conditioning system such as a vehicle air conditioner or a customer convenience system such as an automatic door, and the sCMS represents a monitoring system for CBM of a railway vehicle convenience system.

In addition, FIG. 7 illustrates that the self-monitoring system is applied to an integrated measurement system including all of sWSM, sTSM, and sCMS. In FIG. 7, each of the sWSM, sTSM, and sCMS modules may be self-monitoring systems 1a, 1b, and 1c, and in this case, the integrated measurement system module, iCBM, may serve as the server unit 60. In addition, in FIG. 7, the self-monitoring system may be applied to the integrated measurement system module, iCBM, and in this time, the sWSM, sTSM, and sCMS modules may be sensor modules or self-monitoring system 1a, 1b, and 1c modules according to an embodiment of the present invention. In FIG. 7, when the integrated measurement system module iCBM is a self-monitoring system module according to one embodiment of the present invention, an edge server may serve as the server unit 60.

Self-Monitoring Method

Next, a self-monitoring method according to another aspect of the present invention will be described with reference to the drawings. In this case, the embodiments of the self-monitoring system described with reference to FIG. 1 to FIG. 7 may be equally applied to embodiments of self-monitoring methods, which will be described hereinafter, and duplicate descriptions may be omitted. Accordingly, a detailed description of motion or operation in each step in the embodiment of the self-monitoring method may be understood with reference to the descriptions of the motion or operation in the embodiment of the self-monitoring system described above.

Figure 8:
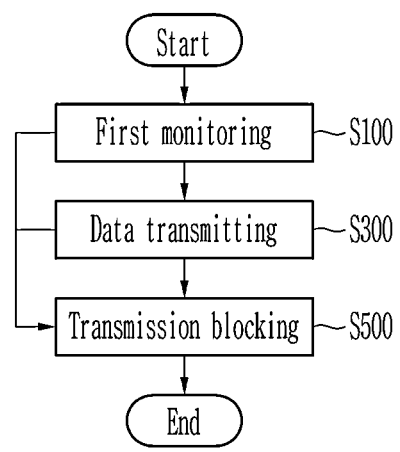
FIG. 8 is a schematic flowchart of a self-monitoring method according to an embodiment of the present invention.
Figure 9:
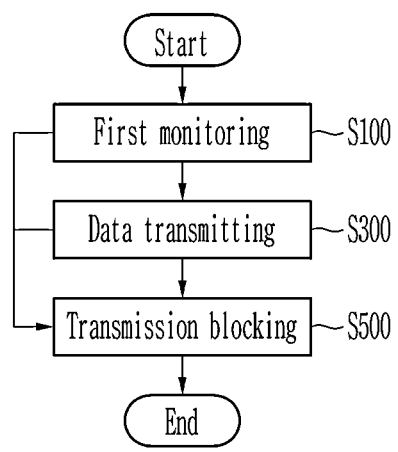
FIG. 9 is a schematic flowchart of a self-monitoring method according to another embodiment of the present invention.
Figure 10:
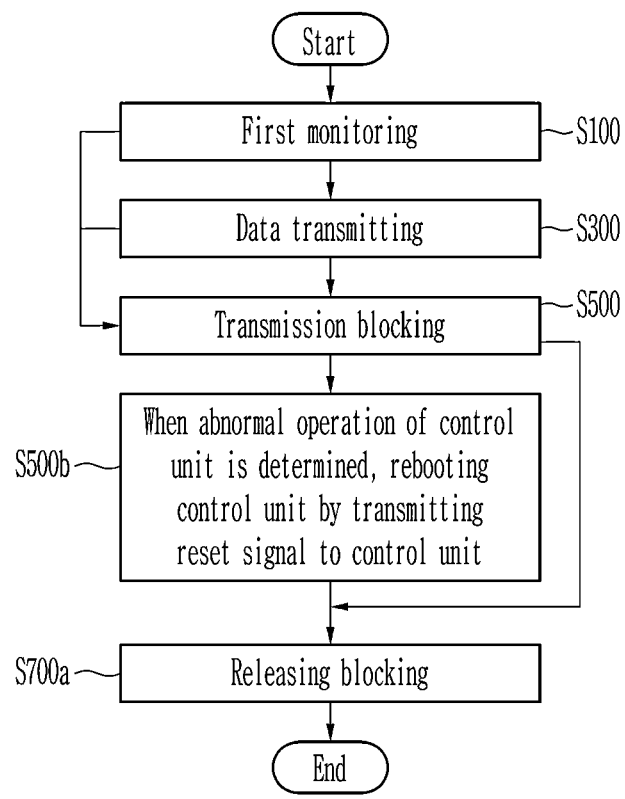
FIG. 10 is a schematic flowchart of a self-monitoring method according to another embodiment of the present invention.
Figure 11:
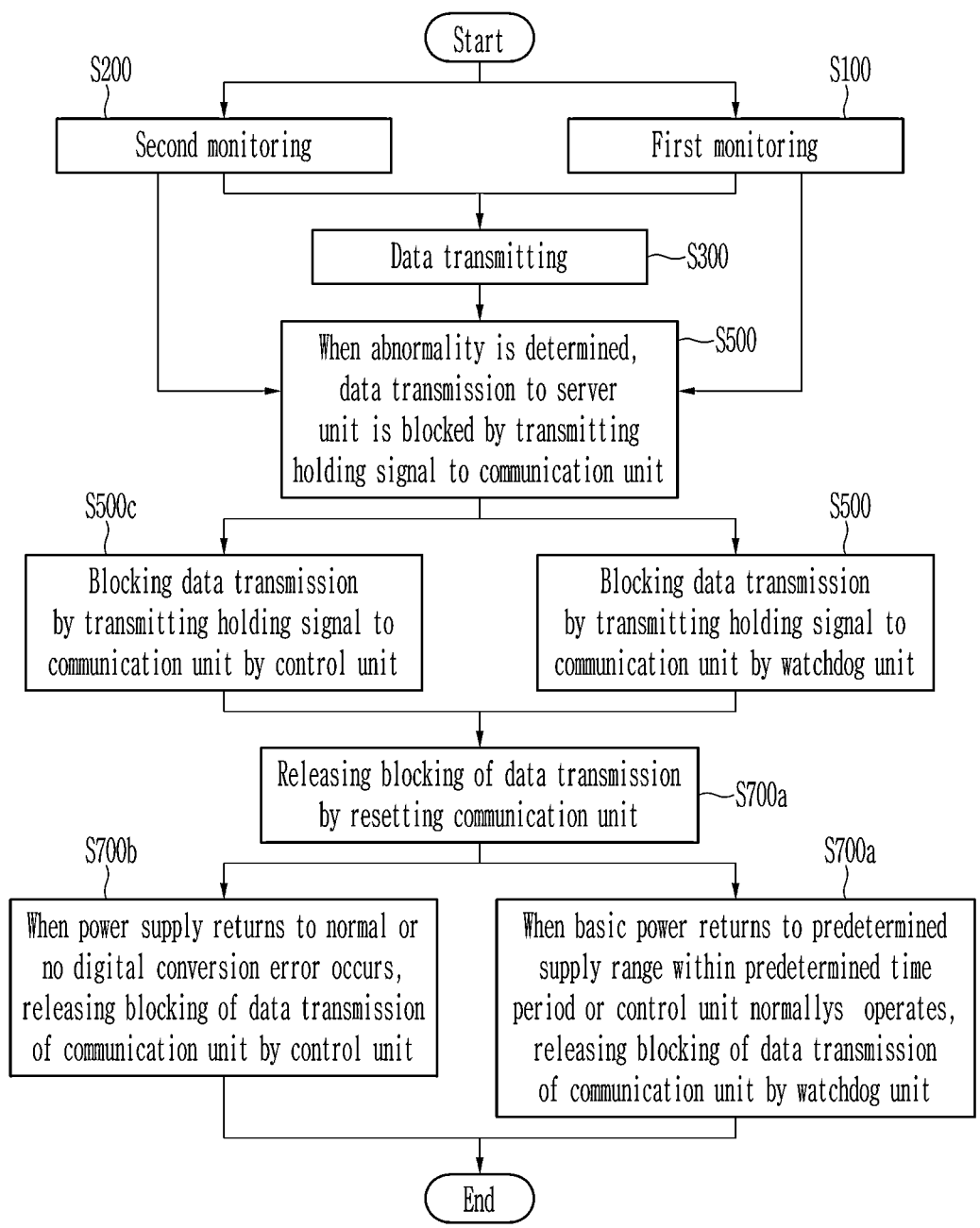
FIG. 11 is a schematic flowchart of a self-monitoring method according to another embodiment of the present invention.
Figure 12:
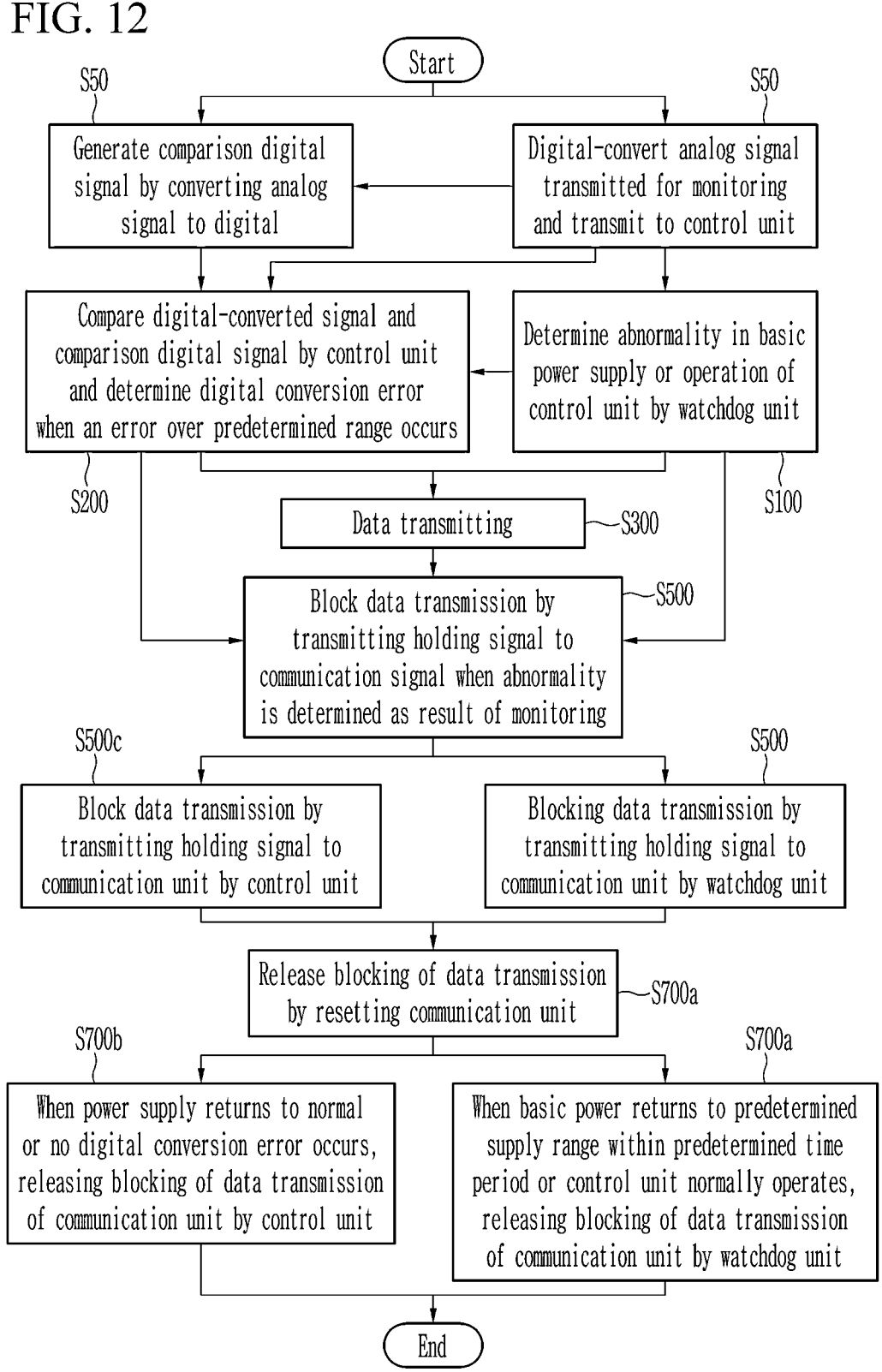
FIG. 12 is a schematic flowchart of a self-monitoring method according to another embodiment of the present invention.
Figure 13:
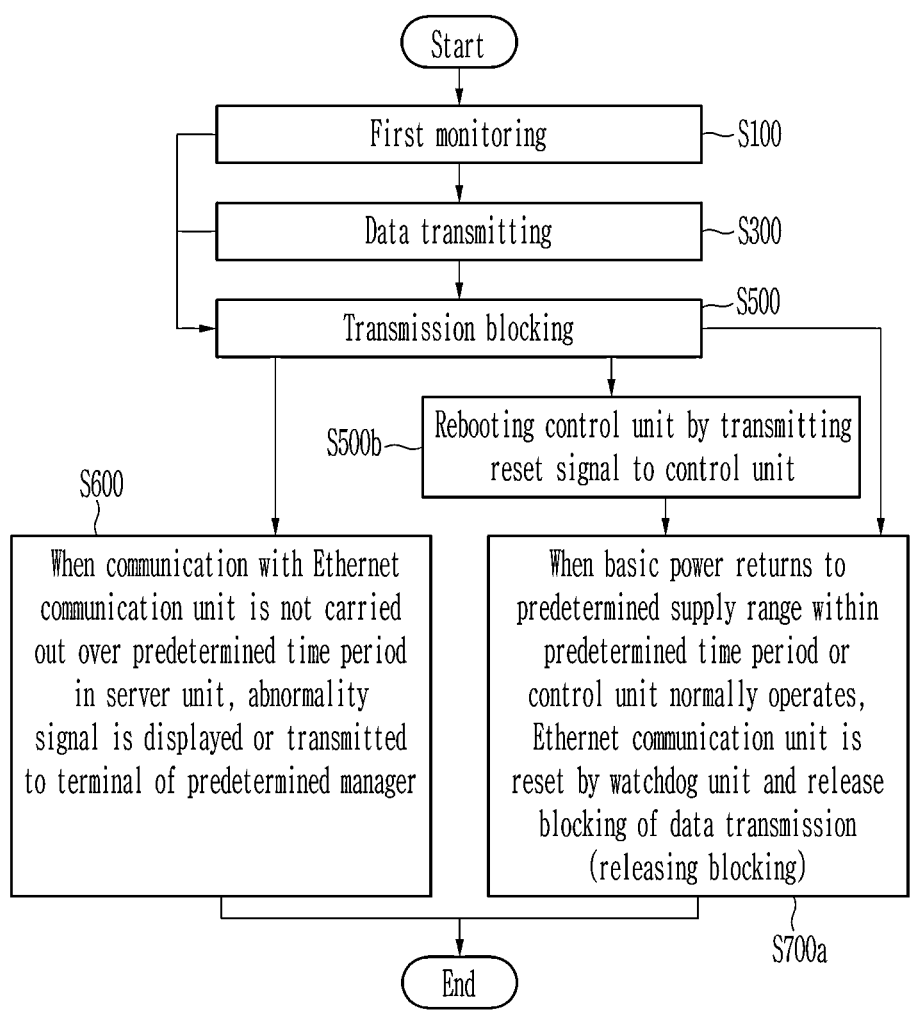
FIG. 13 is a schematic flowchart of a self-monitoring method according to another embodiment of the present invention.

FIG. 8 is a schematic flowchart of a self-monitoring method according to one embodiment of the present invention, FIG. 9 is a schematic flowchart of a self-monitoring method according to another embodiment of the present invention, FIG. 10 is a schematic flowchart of a self-monitoring method according to another embodiment of the present invention, FIG. 11 is a schematic flowchart of a self-monitoring method according to another embodiment of the present invention, FIG. 12 is a schematic flowchart of a self-monitoring method according to another embodiment of the present invention, and FIG. 13 is a schematic flowchart of a self-monitoring method according to another embodiment of the present invention.

Referring to FIG. 8 to FIG. 13, a self-monitoring method according to one embodiment includes first monitoring (S100), data transmitting (S300), and transmission blocking (S500). In addition, in the first monitoring (S100), the status of basic power supplied to the control unit 10 and the operation status of the control unit 10 are monitored by the watchdog unit 20. As described above, the control unit 10 receives and processes the monitoring signal for monitoring of the operation system 5, and the watchdog unit 20 operates with a separate power supply from the basic power. In the data transmitting (S300), the communication unit 30 transmits at least some or all of the monitoring signal processed by the control unit 10 to the server unit 60. In addition, in the transmission blocking (S500), when the watchdog unit 20 detects an abnormality in the basic power supply and the operation of the control unit 10 in the first monitoring (S100), data transmission to the server unit 60 through the communication unit 30 is blocked.

In addition, referring to FIG. 10, the self-monitoring method according to the embodiment may further include blocking releasing (S700). Referring to FIG. 11, a self-monitoring method according to another embodiment may further include second monitoring (S200) by the control unit 10. In addition, referring to FIG. 12, a self-monitoring method according to another embodiment may further include digital converting (S50). Further, referring to FIG. 13, a self-monitoring method according to another embodiment may further include abnormality displaying (S600).

For example, in one embodiment, the self-monitoring method may be applied for condition-based maintenance of an operation system 5 in transportation equipment, power generation equipment, or production equipment.

For example, when the transport equipment is a railway vehicle, the self-monitoring method according to one example may be applied for condition-based maintenance of at least one of a vehicle power delivery systems such as a vehicle wheel set, a vehicle propulsion system such as a vehicle drive motor, a vehicle air conditioning device, and a convenience system such as an automatic door.

Hereinafter, each step will be described in detail with reference to FIG. 8 to FIG. 13.

First Monitoring (S100)

Referring to FIG. 8 to FIG. 13, in the first monitoring (S100), the basic power state supplied to the control unit 10 that receives and processes the monitoring signal for monitoring the operation system 5 and the operation state of the control unit 10 are monitored by the watchdog unit 20 operated by a separate power supply. In an embodiment of the present invention, the monitoring signal refers to a signal that senses or detects the operation or state of the operation system 5. For example, the monitoring signal may be a signal detected by sensors 70 and 70*a* to 70*f* or a signal generated by the operation system 5 that is a monitoring target. In this case, the monitoring signal received by the control unit 10 may be a digital signal, and when the control unit 10 receives an analog signal as the monitoring signal, the control unit 10 may convert the analog signal to digital. In this case, the basic power is power supplied from the power unit 40 to the control unit 10, and the separate power refers to power separately supplied from the power unit 40 to the watchdog unit 20.

For example, referring to FIG. 9, in the first monitoring (S100), the watchdog unit 20 determines whether the basic power supplied to the control unit 10 is out of the predetermined supply range, and the watchdog unit 20 determines the supply abnormality of the basic power, and determines whether the operation of the control unit 10 is abnormal based on whether or not the trigger signal is periodically received from the control unit 10 within a predetermined period.

Data Transmitting (S300)

Referring to FIG. 8 to FIG. 13, in the data transmitting (S300), the communication unit 30 transmits at least some or all of the monitoring signal processed in the control unit 10 to the server unit 60.

Transmission Blocking (S500)

Referring to FIG. 8 to FIG. 13, in the first monitoring (S100), when an abnormality is detected in the basic power supply and the operation of the control unit 10, the watchdog unit 20 blocks data transmission from the transmission blocking (S500) to the server unit 60 through the communication unit 30.

For example, referring to FIG. 9, in the transmitting blocking (S500), when it is determined that the supply of basic power is abnormal or the operation of the control unit 10 is abnormal, the watchdog unit 20 may transmit a holding signal to the communication unit 30 to block the data transmission of the communication unit 30.

In addition, referring to FIG. 10, when the watchdog unit 20 determines that the control unit 10 operates abnormally in transmission blocking (S500*b*), the watchdog unit 20 may transmit a reset signal to the control unit 10 to reboot the control unit 10.

For example, referring to FIG. 11, in the second monitoring (S200), when it is determined that there is an error in the monitoring result supply power or a digital conversion error, the control unit 10 transmits a holding signal to the communication unit 30 in transmission blocking (S500*c*) to block data transmission.

Blocking Releasing (S700*a* and S700*b*)

Referring to FIG. 10 to FIG. 11, in one example, the self-monitoring method may further include blocking releasing (S700*a* and S700*b*). Referring to FIG. 10, in blocking releasing (S700*a*), when the basic power supply in the abnormal state returns to a predetermined supply range within a predetermined time period or the control unit 10, which has abnormally operated, normally operates after the transmission blocking (S500), the watchdog unit 20 may release a data transmission blocking state by resetting the communication unit 30.

For example, referring to FIG. 11, in blocking releasing (S700*b*), when the supply power in the abnormal state returns to normal within a certain period of time after the transmission blocking (S500*c*) or no digital conversion error occurs in the digital conversion process, the control unit 10 resets the communication unit 30 to release the data transmission blocking state. That is, when the control unit 10 determines that there is no problem in the state of the digital data processed by the ADC unit 50 within a certain period of time in the control unit 10 and there is no problem in the power supply to the peripheral devices such as the sensors 70 and 70*a* to 70*f*, the holding state of the communication unit 30 can be released. Here, the predetermined time for determining that the supply power returns to the normal state, the predetermined time for determining that the basic power returns to the normal state, and the predetermined supply time may be the same or different from each other.

For example, the blocking releasing (S700*a*) of FIG. 10 and the blocking releasing (S700*b*) of FIG. 11 may be implemented together in one embodiment.

Second Monitoring (S200)

Referring to FIG. 11, the self-monitoring method according to one example may further include the second monitoring (S200). In the second monitoring (S200), the control unit 10 may monitor a state of the power supplied to at least one of the sensors 70 and 70*a* to 70*f* for detecting the status of the operation system 5, or the operation system 5, which is a monitoring target, or monitor digital conversion errors of analog signals among monitoring signals. In this case, the analog signal may be a signal detected by at least one of the sensors 70 and 70*a* to 70*f* or a signal generated by the operation system 5, which is a monitoring target.

For example, referring to FIG. 11, in the transmission blocking (S500), when it is determined that there is a problem with the monitoring result supply power or a digital conversion error in the second monitoring (S200), the control unit 10 transmits a holding signal to the communication unit 30 to block data transmission.

For example, referring to FIG. 12, in the second monitoring (S200), the control unit 10 compares the digital signal received from the ADC unit 50 with the comparison digital signal, and when there is an error over the predetermined range between the digital signal and the comparison digital signal, it can be determined as a digital conversion error.

Digital Converting (S50)

Referring to FIG. 12, in another example, the self-monitoring method may include digital converting (S50). In the digital converting (S50), an analog signal for monitoring is converted to digital by the ADC unit 50 and the digital signal is transmitted to the control unit 10, and an analog-digital converter (ADC) 11*a* installed in the control unit 10 separately receives an analog signal that has not been converted to digital through the ADC unit 50 and converts the analog signal to digital to generate a comparison digital signal.

In this case, in the second monitoring (S200), the digital signal converted by the ADC unit 50 in the digital converting (S50) and the comparison digital signal converted by the ADC 11*a* of the control unit 10 are compared in the control unit 10, and when there is an error over the predetermined range between the digital signal and the comparison digital signal, the control unit 10 may determine a digital conversion error.

Abnormality Displaying (S600)

Referring to FIG. 13, the self-monitoring method according to another example may further include abnormality displaying (S600). In the abnormality displaying (S600), when the server unit 60 cannot communicate with the communication unit 30 for more than a predetermined time period, an abnormal signal may be displayed or transmitted to a predetermined administrator terminal.

In the above, the above-described embodiments and the accompanying drawings are illustratively described to help a person of ordinary skill in the art for the present invention, not to limit the scope of the present invention. In this case, numerous variation examples can be implemented obviously according to various combinations of the above-described constituent elements by a person of ordinary skill in the art. That is, various embodiments of the present invention can be implemented in numerous variations according to various combinations of the above-described constituent elements in a range that does not deviate from the essential characteristics of the present invention. Accordingly, the range of the present invention should be interpreted according to the invention described in the claimed range, and includes various modifications, alternatives, and equivalent embodiments by a person of ordinary skill in the art as well as the above-described embodiments.

The invention claimed is:

1. A self-monitoring system comprising:
a control unit that receives and processes a monitoring signal for monitoring of an operation system;
a power unit that supplies basic power to the control unit;
a communication unit that transmits at least a part or all of the monitoring signal processed by the control unit to a server unit; and
a watchdog unit that monitors supply of the basic power and operation of the control unit, and blocks data transmission to the server unit through the communication unit when an abnormality is sensed in the supply of the basic power or the operation of the control unit, wherein
the watchdog unit includes a counter, the counter periodically receives a trigger signal from the control unit, and
the watchdog unit determines that the control unit abnormally operates when the counter does not receive the trigger signal within a predetermined time period.

2. A self-monitoring system comprising:
a control unit that receives and processes a monitoring signal for monitoring of an operation system;
a power unit that supplies basic power to the control unit;
a communication unit that transmits at least a part or all of the monitoring signal processed by the control unit to a server unit; and
a watchdog unit that monitors supply of the basic power and operation of the control unit, and blocks data transmission to the server unit through the communication unit when an abnormality is sensed in the supply of the basic power or the operation of the control unit, wherein
the monitoring signal includes a digital signal converted to digital and provided to the control unit, and an analog signal provided to the control unit without digital conversion, and
the control unit monitors a state of supply power supplied to at least one sensor that senses a state of the operation system or supplied to the operation system from the power unit or a digital conversion error of an analog signal among the monitoring signals, and when there is an error in the supply power or the digital conversion error is determined, a holding signal is transmitted to the communication unit to block data transmission.

3. The self-monitoring system of claim 2, wherein
the watchdog unit receives separate power from the power unit, determines whether the basic power supplied to the control unit is not included in a predetermined supply range, and determines whether the control unit operates normally, and when the basic power is not included in the supply range or the control unit abnormally operates, the watchdog unit transmits a holding signal to the communication unit to block data transmission.

4. The self-monitoring system of claim 3, wherein
the watchdog unit reboots the control unit by transmitting a reset signal to the control unit when the abnormal operation of the control unit is determined, and
the watchdog unit resets the communication unit to release a data transmission blocking state when the basic power returns to the predetermined supply range within a certain period of time after deviating from the predetermined supply range or when the control unit operates normally after the abnormal operation.

5. The self-monitoring system of claim 2, further comprising an ADC unit that performs digital conversion to a digital signal provided to the control unit,
wherein the control unit includes a separate analog-digital converter built therein to convert the analog signal to digital to generate a comparison digital signal, compares the digital signal received from the ADC unit with the comparison digital signal, and determines the digital conversion error when there is an error over a predetermined range between the digital signal and the comparison digital signal.

6. The self-monitoring system of claim 2, wherein the self-monitoring system is applied for condition-based maintenance of the operation system in transportation equipment, power generation equipment, or production equipment.

7. The self-monitoring system of claim 6, wherein
the transportation equipment is a railway vehicle, and
the self-monitoring system is applied to at least one module among a module for a condition-based maintenance system of a vehicle wheel set, a module for a condition-based maintenance system of a vehicle drive motor, and a module for a condition-based maintenance system of vehicle air conditioning equipment, respectively, or is applied to an integrated system including at least two of the above-stated modules.

8. The self-monitoring system of claim 2, wherein
when the server unit cannot communicate with the communication unit for more than a predetermined time period, the server unit displays an abnormal signal or transmits an abnormal signal to a predetermined administrator terminal.

9. A self-monitoring method comprising:
first monitoring for monitoring a state of basic power supplied to a control unit that receives and processes a monitoring signal for monitoring of an operation system and an operation state of the control unit by a watchdog unit;
data transmitting in which at least a part or all of the monitoring signal processed by the control unit to a server unit in a communication unit; and
transmission blocking in which the data transmission to the server unit through the communication unit is blocked when it is monitored that the supply of the basic power or operation of the control unit is abnormal in the first monitoring by the watchdog unit, wherein
in the first monitoring, the supply abnormality of the basic power is determined based on whether the basic power supplied to the control unit is not included in the predetermined supply range and the operation abnormality of the control unit is determined based on whether a trigger signal periodically received by the watchdog unit from the control unit is received within a predetermined period, and in the data transmission blocking, when it is determined that the supply of the basic power is abnormal or the operation of the control unit is abnormal, the watchdog unit transmits a holding signal to the communication unit to block data transmission.

10. The self-monitoring method of claim 9, wherein in the transmission blocking, the watchdog unit reboots the control unit by transmitting a reset signal to the control unit when determining abnormal operation of the control unit, and the self-monitoring method further comprises, when the basic power returns to within the predetermined supply range within a certain period of time or the control unit operates normally after the transmission blocking, releasing blocking in which the data transmission blocking state is released by resetting the communication unit by the watchdog unit.

11. A self-monitoring method comprising:

first monitoring for monitoring a state of basic power supplied to a control unit that receives and processes a monitoring signal for monitoring of an operation system and an operation state of the control unit by a watchdog unit;

data transmitting in which at least a part or all of the monitoring signal processed by the control unit to a server unit in a communication unit; and transmission blocking in which the data transmission to the server unit through the communication unit is blocked when it is monitored that the supply of the basic power or operation of the control unit is abnormal in the first monitoring by the watchdog unit, wherein the monitoring signal includes a digital signal converted to digital and provided to the control unit, and an analog signal provided to the control unit without digital conversion, the self-monitoring method further comprises second monitoring in which a state of supply power supplied to at least one of sensors sensing the state of the operation system or supplied to the operation system or a digital conversion error of an analog signal among the monitoring signal is monitored by the control unit, and in the transmission blocking, data transmission is blocked by transmitting a holding signal to the communication unit by the control unit when there is an abnormality in the supply power or the digital conversion error is determined in the second monitoring.

12. The self-monitoring method of claim 11, wherein the control unit comprises a built-in analog-digital converter separately from an analog-digital converting unit that converts digital signals provided to the control unit and transmits them to the control unit, the self-monitoring method further comprises digital converting in which the analog signal is digitally converted to generate a comparison digital signal by the analog-digital converter by the control unit, and in the second monitoring, the digital signal received from the analog-digital converting unit is compared with the comparison digital signal, and when there is an error over the predetermined range between the digital signal and the comparison digital signal, the digital conversion error is determined.

13. The self-monitoring method of claim 11, further comprising abnormality displaying in which an abnormal signal is displayed or an abnormal signal is transmitted to a predetermined manager terminal when communication with the communication unit is not possible for more than a predetermined time period by the server unit.

14. The self-monitoring method of claim 11, wherein the self-monitoring method is applied for condition-based maintenance of the operation system in transportation equipment, power generation equipment, or production equipment.

15. The self-monitoring method of claim 14, wherein the transportation equipment is a railway vehicle, and the self-monitoring method is applied for condition-based maintenance of at least one of a vehicle wheel set, a vehicle drive motor, and a vehicle air conditioner.

* * * * *